United States Patent [19]

Sommer et al.

[11] 4,257,070

[45] Mar. 17, 1981

[54] METHOD FOR CONVERTING A VIDEO SIGNAL INTO A BLACK/WHITE SIGNAL

[75] Inventors: Rudiger Sommer, Raisdorf; Hermann Wischer, Kiel, both of Fed. Rep. of Germany

[73] Assignee: Dr.-Ing. Rudolf Hell GmbH, Firma, Kiel, Fed. Rep. of Germany

[21] Appl. No.: 26,726

[22] Filed: Apr. 3, 1979

[30] Foreign Application Priority Data

Apr. 6, 1978 [DE]   Fed. Rep. of Germany ....... 2814891

[51] Int. Cl.$^3$ ............................................... H04N 1/40
[52] U.S. Cl. .................................... 358/282; 358/280; 358/283
[58] Field of Search ............... 358/280, 282, 283, 263, 358/96

[56] References Cited

U.S. PATENT DOCUMENTS 3,757,036   9/1973   Libbet ................................. 358/263

*Primary Examiner*—Howard W. Britton
*Attorney, Agent, or Firm*—Brisebois & Kruger

[57] ABSTRACT

A facsimile scanning method for converting a video signal, generated by opto-electronic scanning of an original copy, into a bilevel black/white signal in facsimile reproduction.

In the black/white recording of colored originals in which both the background and the information can be white, black, grey or colored, white/grey (colored)/black transitions in the original are frequently not picked up correctly so that information is lost in the copy.

The invention solves this problem by recording colored, grey or black areas in the original as "white" with black boundary lines, by means of suitable electronic circuits.

If the colored area in the original is a background area without information content of its own but containing a black item of information (letter), the legibility of the black letter in the area is increased in the copy by reproducing the background area as "white". On the other hand, the background area remains recognizable in the copy with respect to the white of the paper by virtue of its surround.

If the colored area in the original, however, is itself an item of information, e.g. a broad letter, the line-boundary according to the invention causes at least the contour of the letter to be recorded in the copy, making the letter legible.

In general, black areas in the original can be reproduced in the copy as white areas with black surround. This has the advantage that overheating of thermal print of needle print recording devices is avoided due to the reduced black component in the copy.

25 Claims, 9 Drawing Figures

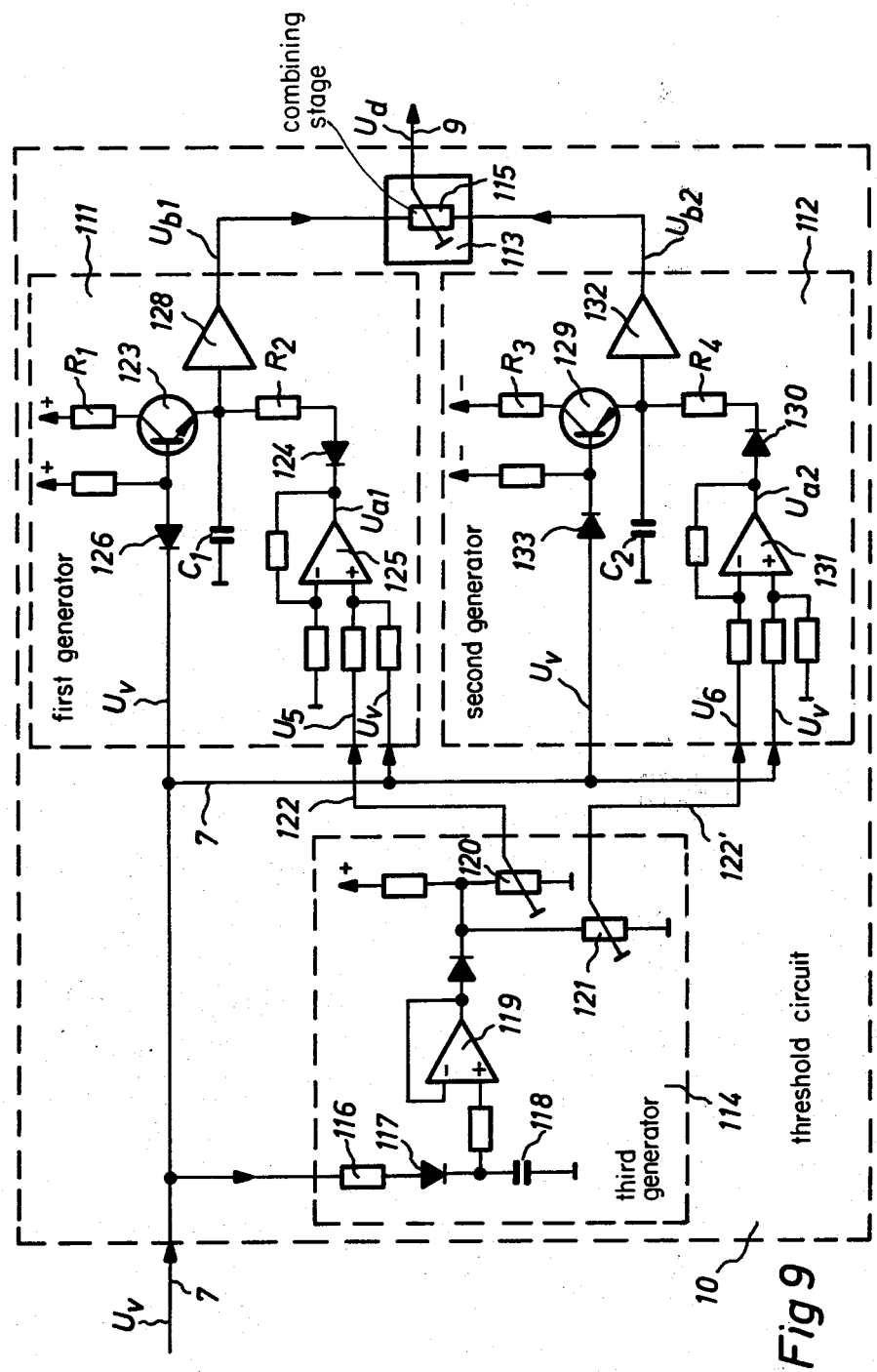

METHOD FOR CONVERTING A VIDEO SIGNAL INTO A BLACK/WHITE SIGNAL

BACKGROUND OF THE INVENTION

The present invention relates to a method for converting a video signal, generated by scanning an original copy dot by dot and line by line, into a bilevel black/white signal in facsimile reproduction.

In black/white facsimile reproduction an original copy to be copied is scanned dot by dot and line by line in a scanner by means of an opto-electronic scanning means and the brightness information of the original copy is converted into a video signal.

The original may be a printed or type-written document, a hand-written text or a graphic representation in which both the background of the original copy and the information placed on it can be white, black, grey or coloured.

The video signal generated by scanning the original is amplified, converted into a bilevel black/white signal and transmitted to a receiver via a transmission channel. The recording element of the receiver controlled by the video signal generates the required copy of the original.

When a white portion of the image of the original is being scanned the scanning means provides a high video signal amplitude, scanning a black portion of the image results in a low amplitude and a grey or coloured detail in the original in a medium amplitude of the video signal.

In order to generate a bilevel signal, the different video signal amplitudes are continuously compared with a threshold signal to arrive at a decision if a video signal amplitude is to be evalued as "white" or "black" and to be converted into the white value or the black value of the bilevel signal.

There are problems in the decision-making process, particularly if the background of an original has white and coloured areas containing, at the same time, information so that the information/background contrast is low. In this case the scanning means, due to its limited resolution, will deliver a video signal with small amplitude changes which have to be recognised with the aid of the threshold signal and evaluated correctly.

It is already known from U.S. Pat. No. 3,159,815 how to compare the video signal with a constant threshold signal in order to generate the bilevel signal.

With this so-called "constant threshold" the evaluation can only be carried out quite inadequately with a coloured original.

If, for example, an original with a coloured background and black or white information content is scanned and the decision for medium amplitudes of the video signal is basically "black" the black information on coloured background is lost; if, on the other hand, the decision is exclusively for "white", the white information on coloured background will not be considered.

It is true that an operator can select the constant threshold signal with respect to favourable results before scanning proper commences, but it is not possible to set the threshold to an optimum value not involving loss of information.

From British Patent specification No. 1,188,337 a facsimile scanner with a threshold circuit is known in which the bilevel signal is obtained by comparing the video signal with a threshold signal following it dynamically. In this arrangement the dynamic threshold signal is derived from two accompanying signals.

Although the so-called "dynamic threshold" is suitable for correct evaluation of low differences in contrast in the original copy, it produces extremely poor results if there are white/grey/black transitions running in the direction of scanning. An example for this is a white-edged original copy with coloured or grey background containing black information (letters). The known threshold circuit will interpret the coloured background as "black" so that the black information is lost.

Another example is an original in which a white area is followed by coloured information and a black background. In this case, the coloured information is reproduced as "black" so that information and background merge into each other.

It would be possible to set the known threshold circuit until it is sensitive enough to evalue the background colouration as "white" and the black information on it is recognised. In this case, however, information of lesser density as, e.g. red writing on a white area would be lost.

For this reason, individual adjustment will always only make it possible to find a compromise between high sensitivity and loss of information. For such an adjustment an experienced operator is required and it is also time-consuming since test copies must be made for evaluation.

A further disadvantage of the known threshold circuit consists in that grey or coloured areas are reproduced exclusively as "black". If a facsimile receiver is equipped, e.g. with thermal print or needle print recording devices which require a certain amount of energy for recording a black image dot in each case, the recording device can easily overheat if the original copy has a large black content.

It is an object of the invention to define a method for converting a video signal, generated by scanning an original copy dot by dot and line by line, into a bilevel black/white signal in facsimile reproduction, in which coloured original copies are converted into pure black/white copies without any significant loss of information. In these original copies both background areas and information on them can be coloured, grey, black or white.

SUMMARY OF THE INVENTION

According to the invention, this object is achieved by recording coloured, grey or black areas in the original as "white" edged with black boundary lines.

In one specific embodiment, the video signal is converted into said black/white signal by comprising it with a threshold signal following it dynamically, a signal step occurring in said black/white signal at every intersection point of said video signal and said threshold signal, and for generating a boundary line running transversely with respect to the direction of the lines at the beginning of the area, said black/white signal is switched to "white" after a first time interval beginning with the step in the signal from "white" to "black" if there has been no step in the signal from "black" to "white" in said first time interval.

BRIEF DESCRIPTION OF THE DRAWINGS

In order that the invention may be more clearly understood, reference will now be made to the accompanying drawings which show certain embodiments thereof by way of example, and in which:

FIG. 9 shows an advantageous illustrative embodiment of a threshold circuit.

DETAILED DESCRIPTION OF PREFERRED EMBODIMENTS

Figure 1:
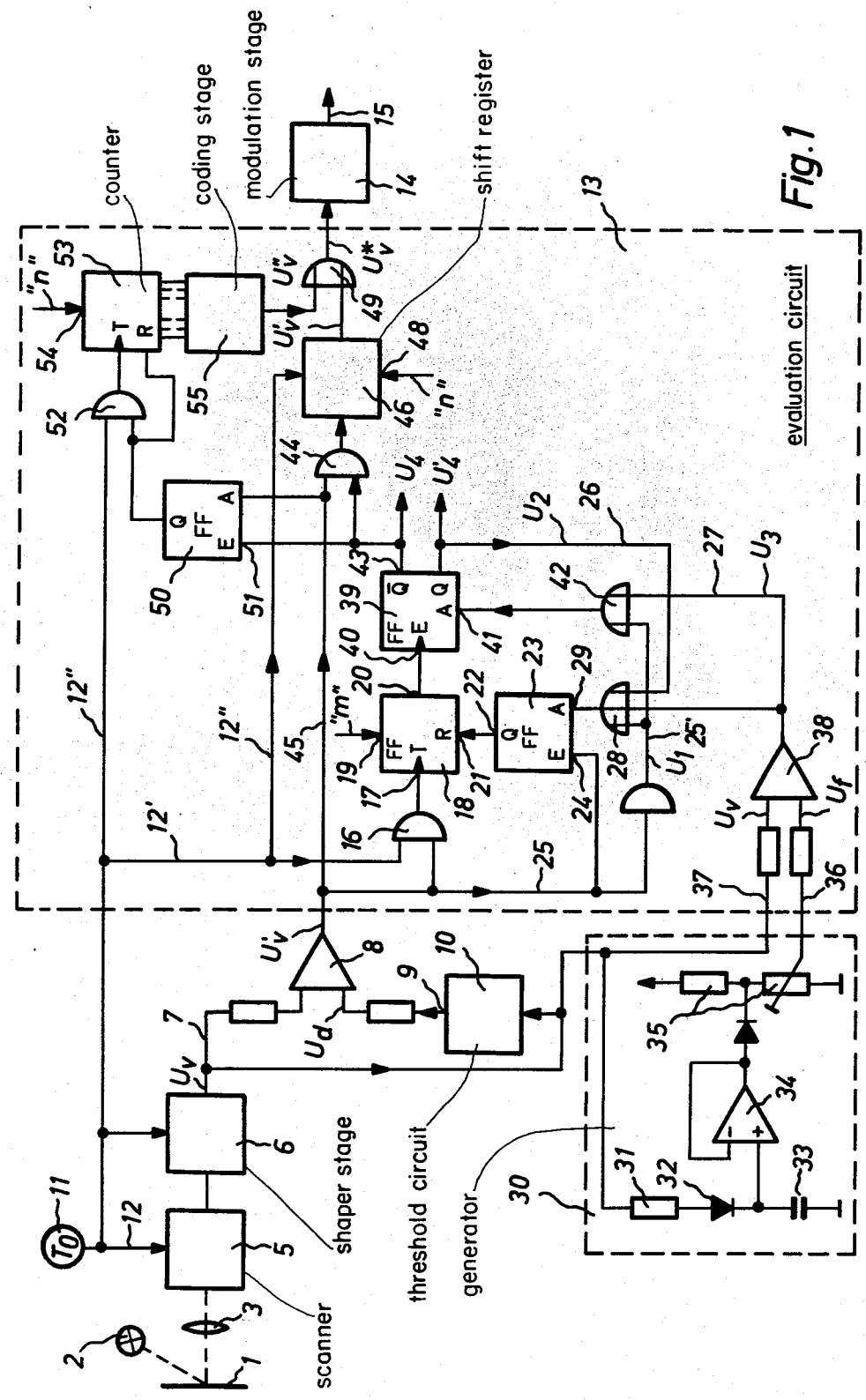
FIG. 1 shows a block diagram of a facsimile scanner with an evaluation circuit for a bilevel signal.

Referring now to the drawings, FIG. 1 shows the basic configuration of a facsimile scanner with an evaluation circuit for a bilevel signal. The original 1 to be copied is illuminated by a light source 2 and the light modulated by the brightness information of original 1 is reflected through an optical system 3 into a scanner 5, where it is converted into a video signal by means of photoelectronic converters.

The opto-electronic converter can be an individual photo diode delivering a continuous video signal. In this case the scanner 5 performs a relative movement with respect to original 1 in the direction of the lines and advances, after having scanned each line, to the next line.

On the other hand, the opto-electronic converter can be built up of a multiplicity of photo diodes (photo diode line) extending in a row across a whole line of original 1.

In this case one whole line each is scanned without any relative movement taking place between scanner 5 and original 1, an advance step being performed to the next line after each line scan. These photo diode lines supply a pulsed or step-shaped video signal.

No advance devices are shown in FIG. 1 since per se they form no part of the present invention and are widely known as state of the art.

The video signal generated in scanner 5 is amplified in a signal shaper stage 6 and, if necessary, converted into a stepped video signal by means of a sample and hold circuit, if the video signal is pulsed.

The video signal $U_v$ is fed via line 7 to a comparator 8 in which it is converted into a digital video signal $U'_v$ with levels "black" (logical H) and "white" (logical L) by being compared with a threshold signal $U_d$ on a line 9.

In the illustrative embodiment the threshold signal $U_d$ dynamically follows the video signal $U_v$. An advantageous embodiment for a threshold circuit 10 for generating this so-called "dynamic threshold" is specified in FIG. 9.

The element-by-element scanning of the image of the original 1 is controlled by a scanning clock sequence $T_o$, one clock cycle being associated with each picture element. The scanning clock sequence $T_o$ is generated in a clock generator 11 and is fed to the scanner 5 and the signal shaper stage 6 via lines 12.

The digital video signal $U'_v$ obtained in comparator 8 is converted in an evaluation circuit 13 into the digital video signal $U_v^*$. Finally, the video signal $U_v^*$ is transferred via a modulation stage 14 and a transmission channel 15 to a facsimile receiver, not shown, the recording device of which generates the facsimile of the original copy. The transmission channel 15 can be a line or a radio link.

In the following the design and function of the evaluation circuit 13 according to the invention is to be described.

For the purpose of generating the vertical boundary lines the width of which is determined by a number of picture elements, the scanning clock sequence $T_o$ is fed from clock generator 11 via a line 12' and an AND gate 16 to the clock input 17 of a first picture element counter 18.

The picture element counter 18 is built up, e.g. of integrated 4-bit binary counters as marketed by Texas Instruments as type SN 74192. These and all other integrated components still mentioned are available in the trade and known to the expert so that they do not need to be described in detail.

The picture element counter 18 is preset at a programming input 19 to a number "m" of picture elements, according to the desired width of the boundary line. With a resolution of eight picture elements per millimeter the width is preferably twenty picture elements. In the illustrative embodiment the picture element counter 18, therefore, is preprogrammed for "20" so that after 20 clock cycles a pulse appears at its output 20, provided the picture element counter 18 has been enabled by an instruction at its reset input 21 and is not reset before counting has stopped.

The instruction is generated at the Q output 22 of a switch 23, the "enable" instruction (logical H) being signalled in the switch-on state and the "reset" instruction (logical L) in the switched-off state.

The picture element counter 18 is enabled with each white/black step in the digital video signal $U'_v$ which always occurs when the video signal $U_v$ drops below the dynamic threshold signal $U_d$ (intersection point $S_d$). The digital video signal $U'_v$ is fed to the switch-on input 24 of switch 23 via a line 25.

The picture element counter 18 is always reset if at least one of three conditions is met.

In principle, there is a reset by a signal $U_1$ on line 25' when there is a black/white step in the digital video signal $U'_v$.

Another condition is given when the picture element counter 18 has once mounted 20 picture elements (signal $U_2$ on line 26) which is the case, for example, when a large grey or coloured area is being scanned in the original.

The third condition is that the video signal $U_v$ drops below a threshold signal $U_f$ (intersection point $S_f$) with black information, which causes a signal $U_3$ to arise on line 27. This condition occurs, e.g. also when the video signal $U_v$ runs over from "white" to "medium grey" with soft transitions or if contours on the original are scanned obliquely.

The three signals $U_1$, $U_2$ and $U_3$ are fed to the switch-off input 29 of the switch 23 via an OR gate 28.

In the illustrative embodiment the threshold signal $U_f$ is derived from the video signal $U_v$ in a generator 30.

The generator 30 consists of a peak rectifier circuit (31, 32) with a smoothing capacitor 33 and a following high-impedance amplifier 34. The smoothing capacitor 33 is charged in each case to the highest video signal amplitude (white background). The high-impedance amplifier 34 produces a very long discharge time constant and the smoothing capacitor 33 discharges only very little between the individual charging phases. A voltage divider 35 is used to obtain from the voltage across the capacitor the varying threshold signal $U_f$ which is proportional to the average background brightness of the original scanned and assumes a constant value with missing video signal.

Moreover, the threshold signal $U_f$ can also be preset, at a potentiometer, to be constant for the whole scan of the original, independently of the background brightness.

In order to form the signal $U_3$ on line 27, the threshold signal $U_f$ on a line 36 and the video signal $U_v$ on a line 37 are compared in a comparator 38.

The picture element counter 18 is connected to a second switch 39 which is actuated via the switch-on input 40 by the pulse at the output 20 of the picture element counter 18 and is switched off via its switch-off input 41 and OR gate 42 by signals $U_1$ and $U_3$.

Q output 43 generates a control signal $U_4$ controlling AND gate 44 via which the digital video signal $U'_v$ gets to a shift register 46 along line 45. Shift register 46 is built up, e.g. of integrated circuits as marketed by Texas Instruments as type SN 74194. The shift clock used is scanning clock sequence $T_o$ which is fed to the shift register 46 via line 12″. Shift register 46 delays the input signal, i.e. its leading and trailing edges, by "n" cycles of scanning clock sequence $T_o$, corresponding to "n" picture elements. The number "n" can be preset at a programming input 48. In the illustrative embodiment "n" has been selected to be 2.

The delayed signal is fed to the modulation stage 14 via an AND gate 49.

The operation of the evaluation circuit 13 is explained with the aid of three characteristic cases in scanning an original copy.

Figure 2:
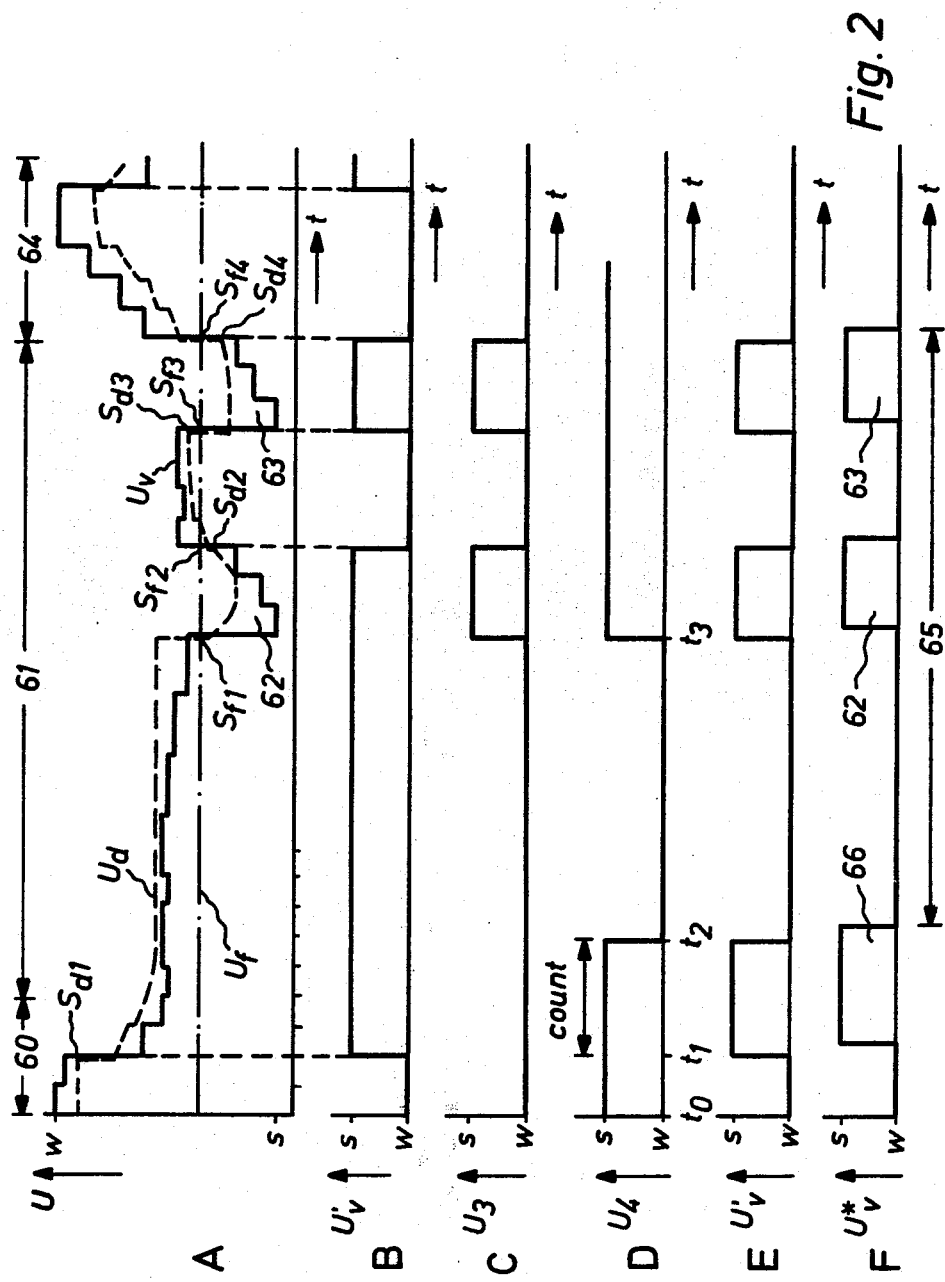
FIG. 2 shows a pulse diagram for the generation of vertical boundary lines.
Figure 3:
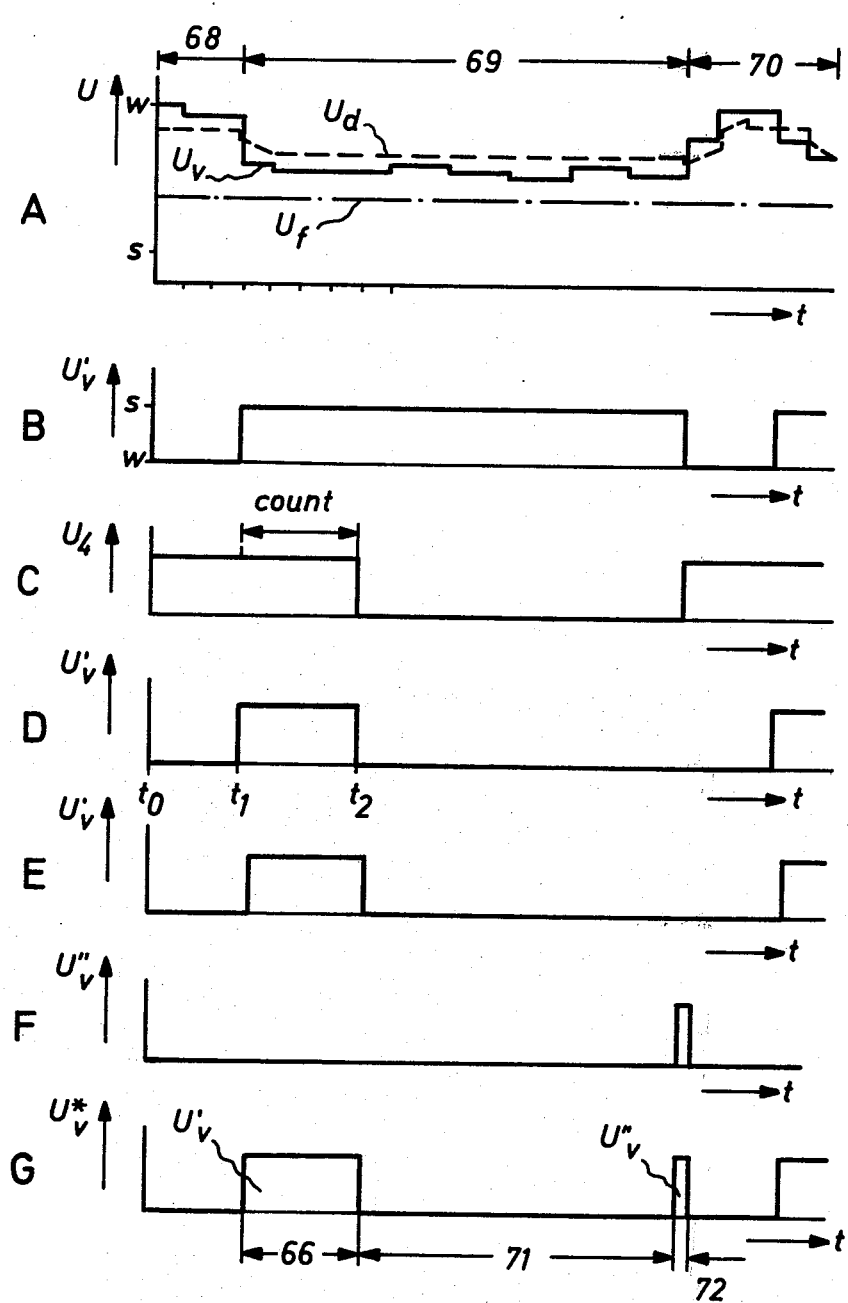
FIG. 3 shows a further pulse diagram.
Figure 4:
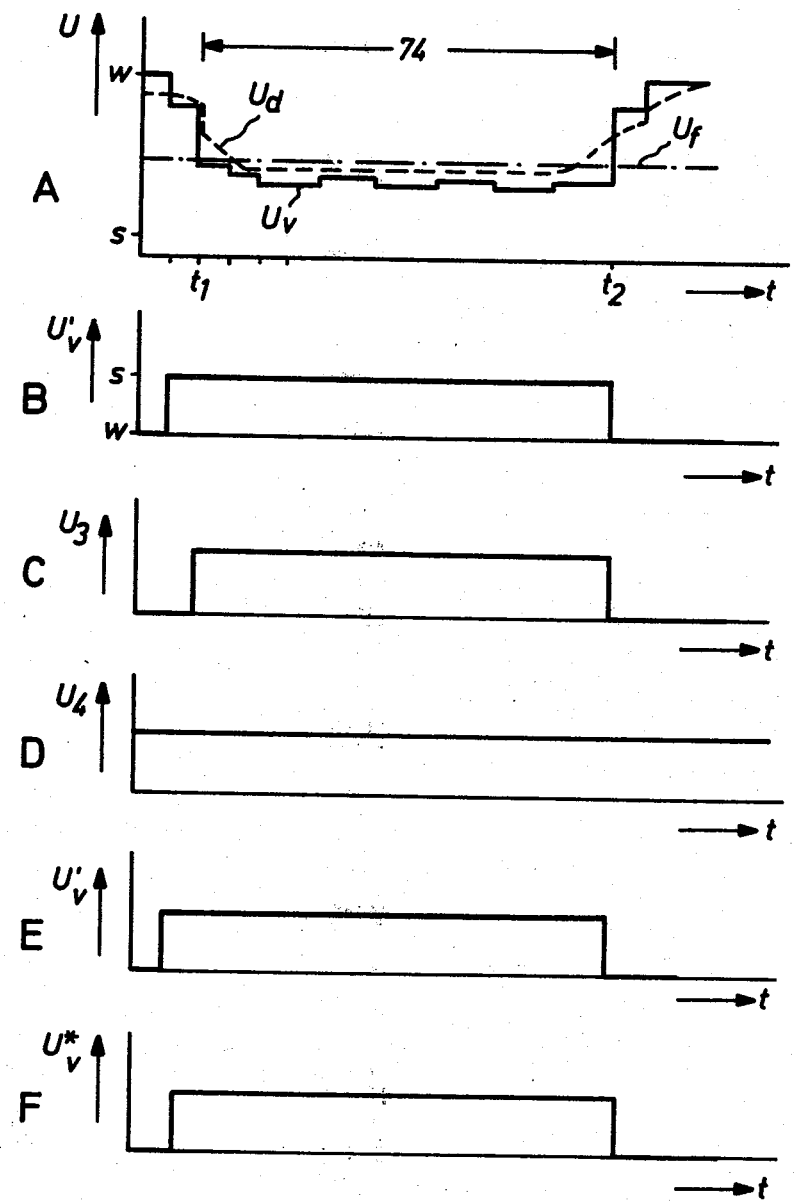
FIG. 4 shows another pulse diagram.

The following graphic representations in FIGS. 2-4 are designed to explain these processes in even greater detail.

Case a:

In the original 1 to be copied, let a white area (e.g. the edge of the original) be followed in the direction of scanning by a coloured or grey area (background) with black information. In the customary threshold circuits the first black item of information is lost.

Due to the evaluation circuit 13, following the threshold circuit 10, the first black item of information is recognised as well.

In order to explain the evaluation circuit 13 it is assumed that the $\overline{Q}$ output 43 of switch 39 is set to H. AND gate 44 is then enabled and the digital video signal $U'_v$ gets to the modulation stage 14 via AND gate 44, shift register 46 and OR gate 49. While the white area is being scanned the digital video signal $U'_v$ signals "white" and when the coloured area is being scanned it signals "black" since it is not acted on at first in the evaluation circuit 13.

At the transition from the white to the coloured area, indicated by a white/black step in the digital video signal $U'_v$ at intersection point $S_{d1}$ of video signal $U_v$ with the dynamic threshold signal $U_d$, the first picture element counter 18 of the evaluation circuit 13 is started and enabled. Assuming there is no reset of picture element counter 18 in its counting phase by one of the aforementioned conditions, the pulse at output 20 of picture element counter 18 will switch on switch 39 after "20" counted scanning clock cycles $T_o$ (picture elements). In this case the output of AND gate 44 is at logical "L" so that the digital video signal $U'_v$ is switched to "white" after 20 picture elements, even if the threshold circuit 10 has evaluated a grey or coloured area of the original as "black". In this way a vertical boundary line is generated at the beginning of an area of the original.

If video signal $U_v$, at the beginning of the black information in the coloured area, intersects the constant threshold signal $U_f$ (intersection point $S_{f1}$) the switchover is cancelled because signal $U_3$ on line 27 switches switch 39 off again. In accordance with the black information the digital video signal $U'_v$ will signal "black" until the black/white step in the digital video signal $U'_v$ at the end of the black information disables the AND gate 44 and the digital video signal $U'_v$ indicates "white" again.

With the aid of the evaluation circuit 13 according to the invention a coloured or grey background area of the original, therefore, is recorded as a white area in the black/white copy. The measures described before make it possible generally to recognize the black information in the original and makes it easily legible on the white background in the copy.

Assuming there is a rectangular background area running at right angles to the direction of the lines, the white area at the same time is delimited advantageously at its left edge, e.g. with respect to the white edge of the original, by a wide black line which is 20 picture elements wide in the illustrative embodiment.

More detailed information is contained in FIG. 2.

Case b:

Let the coloured area not contain any information. It can, therefore, be a pure background area or even coloured information (a wide letter).

In this case the digital video signal $U'_v$ is also switched to "white" after 20 picture elements. It is not switched back, however, for the time being, since now the video signal $U_v$ does not intersect the constant threshold signal $U_f$ and the signal $U_3$ does not switch off switch 39.

Now switch 39 is switched off only at the end of the coloured area by the black/white step in the digital video signal $U'_v$ on line 25' and another switch 50 is actuated via its switch-on input 51. Switch 50 enables an AND gate 52 so that scanning clock sequence $T_o$ is counted into a second picture element counter 53 via line 12‴ so that a rear boundary line is generated. The width of the boundary line is again determined by a number of picture elements. Picture element counter 53 is preset at a programming input 54 to the number "n," in the illustrative embodiment to "n" = 2. With a resolution of 8 picture elements per millimeter the width of the boundary line is preferably fixed to two picture elements.

In a coding stage 55, following the picture element counter 53, a signal $U''_v$ is generated which is at H for only two scan cycles (two picture elements) and during this time signals "black" to modulation stage 14 via AND gate 49 while the digital video signal $U'_v$ of shift register 46 still indicates "white" since shift register 46 has delayed it by two scan cycles.

In this way a two-element-wide black boundary line is generated also at the right-hand edge of the white background area of the copy.

A coloured or grey area, reproduced as pure black in the copy with customary techniques, is now recorded as "white" by means of evaluation circuit 13 and the vertical contours are marked by black boundary lines.

If the coloured area is purely background without its own information content, a "white" reproduction of this area in the copy advantageously increases the legibility of black information in the area.

If the coloured area, however, is information, e.g., a letter, lost with customary techniques, the boundary lines according to the invention will record advantageously at least the contours of the letter, making the letter readable in the copy (FIG. 3).

Case c:

During the scan of the coloured area on the original the video signal $U_v$ intersects both the dynamic threshold signal $U_d$ and the constant threshold signal $U_f$ and switch 39 remains switched off. In this case the digital video signal $U'_v$ passes unmodified through evaluation circuit 13, i.e., the coloured area of the original continues to be recorded as black area in the copy (FIG. 4).

By appropriate selection of the constant threshold signal $U_f$ black areas in the original can also be reproduced as framed white areas in the copy (black area suppression). This has the advantage that the reduced black component in the copy advantageously avoids overheating of the thermal or needle printing recording devices. The black area suppression can be made dependent on the extent of the area in the direction of scanning.

In FIG. 2 the operation of the evaluation circuit 13 is explained for case (a) with the aid of a graphical representation.

(A) shows the step-shaped progress with time of the video signal $U_v$ along a scanning line. Such a signal curve is produced, as mentioned before, on conversion of the video signal of a photo diode line by means of a sample and hold circuit. The cycles of the scanning clock sequence $T_o$ are indicated on the abscissa.

According to case (a), let a white area (edge of the original) be scanned in section 60, a coloured or grey background in section 61 with black information 62 and 63 (e.g., letters) and another white area in section 64.

(A) also shows the dynamic threshold signal $U_d$ generated in the threshold circuit 10 and the threshold signal $U_f$ obtained from generator 30, and the intersection points $S_d$ and $S_f$ of the threshold signals with the video signal $U_v$.

In (B) the curve of the digital video signal $U'_v$ generated as a consequence of the comparison of video signal $U_v$ and the dynamic threshold signal $U_d$ is represented, the components of the video signal $U_v$ lying above the threshold signal $U_d$ being evaluated as white and those below as black value.

Processing of the video signal $U_v$ by a sample and hold circuit causes the leading and trailing edges of the step-shaped video signal $U_v$ and of the digital video signal $U'_v$ and the intersection points $S_d$ and $S_f$ to coincide with the clock pulses of the scanning clock sequence $T_o$.

The course of digital video signal $U'_v$ corresponds to the result generated by comparing the video signal $U_v$ with a customary threshold signal. It can be seen that a coloured area of the original (section 61) is recorded as "black" and the first item of information 62 is lost.

(C) shows the course of signal $U_3$ formed by comparing video signal $U_v$ and threshold signal $U_f$ in comparator 38. Signal $U_3$ produces the decision if the digital video signal $U'_v$ is to be modified in evaluation circuit 13, or not.

In (D) control signal $U_4$ is shown at output 43 of switch 39 and in (E) the output signal of AND gate 44. As described before, the output signal of AND gate 44 is delayed in shift register 46 by two picture elements and appears at the output of evaluation circuit 13 as digital video signal $U^*_v$, as indicated in diagram (F).

In section 61 video signal $U_v$ does not drop below the threshold signal $U_f$ before the first item of information 61 and the picture element counter 18 counts 20 picture elements in the period $t_1-t_2$. In time interval $t_0-t_2$ AND gate 44 is enabled and digital video signal $U'_v$ can pass through AND gate 44, "white" being recorded between $t_0-t_1$ and "black" between $t_1-t_2$. At time $t_2$ the digital video signal $U'_v$ is automatically switched to "white" even though the grey value of section 61 is unchanged. If in the further course of video signal $U_v$ the first black information 62 occurs video signal $U_v$ will intersect threshold signal $U_f$ at intersection point $S_{f1}$ at time $t_3$. This criterion is used to switch digital video signal $U'_v$ back to "black" so that the first item of black information 62 is recognized unequivocally and is not lost.

Thus the coloured or grey area in the original (section 61) is reproduced in the copy by a white area (section 65) in which the black items of information 62 and 63 are easily legible. The white area is marked at its left-hand edge by a black boundary line 66 which is 20 picture elements wide.

In FIG. 3 the operation of evaluation circuit 13 in case (b) is shown with the aid of another graphic representation.

(A) again shows video signal $U_v$ along one scanning line. According to Case (b), let a white area (edge of the original) be scanned in section 68, a coloured or grey area, to be background or information, in section 69 and another white area in section 70. (A) also contains the dynamic threshold signal $U_d$ and the constant threshold signal $U_f$.

Diagram (B) shows the digital video signal $U'_v$ generated by threshold circuit 10. Digital video signal $U'_v$ represents the conditions arising without evaluation circuit 13. It can be seen that the coloured area (section 69) would be reproduced as "black."

Diagram (C) shows the control signal $U_4$ at output 43 of switch 39, (D) video signal $U'_v$ at AND gate 44 and (E) video signal $U'_v$ delayed in shift register 46. (F) shows output signal $U''_v$ of coding stage 55 and (G) digital video signal $U^*_v$ at the output of evaluation circuit 13.

It can be seen from diagram (G) that the coloured area (section 69) is recorded as white area (section 71), marked on its left and right edge by boundary lines 66 and 72.

FIG. 4 explains the operation of evaluation circuit 13 in Case (c) with the aid of another graphical representation.

If the grey or coloured background of the original is very dark (section 74) and video signal $U_v$ immediately drops below the constant threshold signal $U_f$ at time $t_1$, this area is interpreted as "black," as before, until video signal $U_v$ again intersects dynamic threshold signal $U_d$ at time $t_2$.

Figure 5:
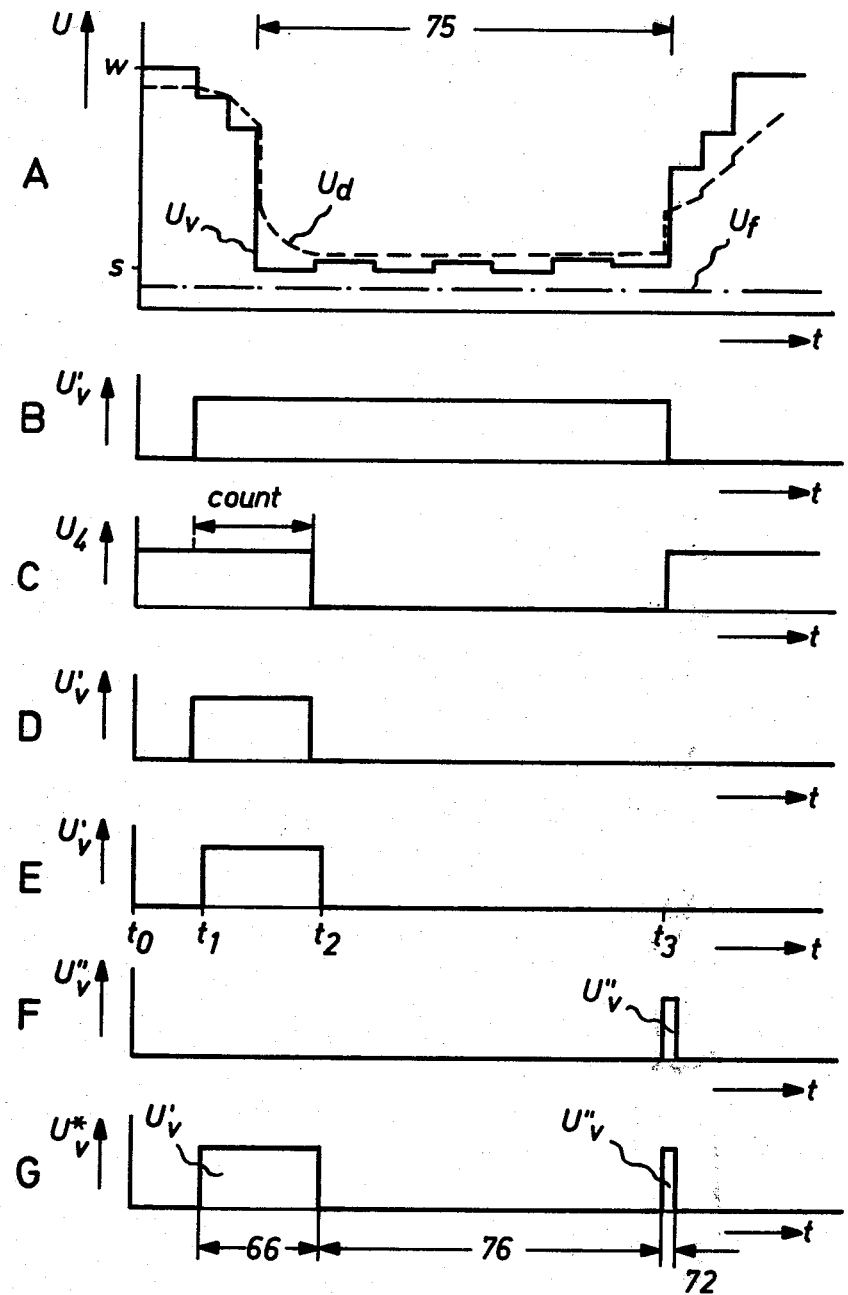
FIG. 5 shows a pulse diagram for black area suppression.

In FIG. 5 a diagram shows the operation of evaluation circuit 13 with black area suppression.

In contrast to the diagrams shown before, threshold signal $U_f$ is put below the lowest amplitude of video signal $U_v$, obtained on scanning a black area in the original (section 75), so that there are no intersection points between video signal $U_v$ and threshold signal $U_f$.

In this case the counting process in picture element counter 18 is not interrupted by signal $U_3$ and digital video signal $U^*_v$ is switched to "white" after 20 picture elements at time $t_2$, as shown in diagram (G).

At the intersection point of video signal $U_v$ with the dynamic threshold signal $U_d$ at time $t_3$ then coding stage 55 supplies output pulse $U''_v$ shown in (F). It can be seen from diagram (G) that the black area (section 75) is also recorded as white area (section 76) and is delimited laterally by boundary lines 66 and 72.

For reasons of simplicity grey or coloured areas of the original have hitherto been referred to as being reproduced on the copy as white areas with vertical black boundary lines.

Evaluation circuit 13, however, also generates boundary lines running transversely to the line direction from vertically to nearly horizontally, so that areas on the original with any shape and oriented in the plane of scanning can be framed completely by appropriate boundary lines.

Since the boundary lines are composed of line elements with respect to lines, the individual line elements, of course, with boundary lines running at small angles to the horizontal, are displaced in the direction of the line in such a way that the line drawn is not closed. With exactly horizontal edges in the original there are no boundary lines at all which, however, are often desired.

Figure 6:
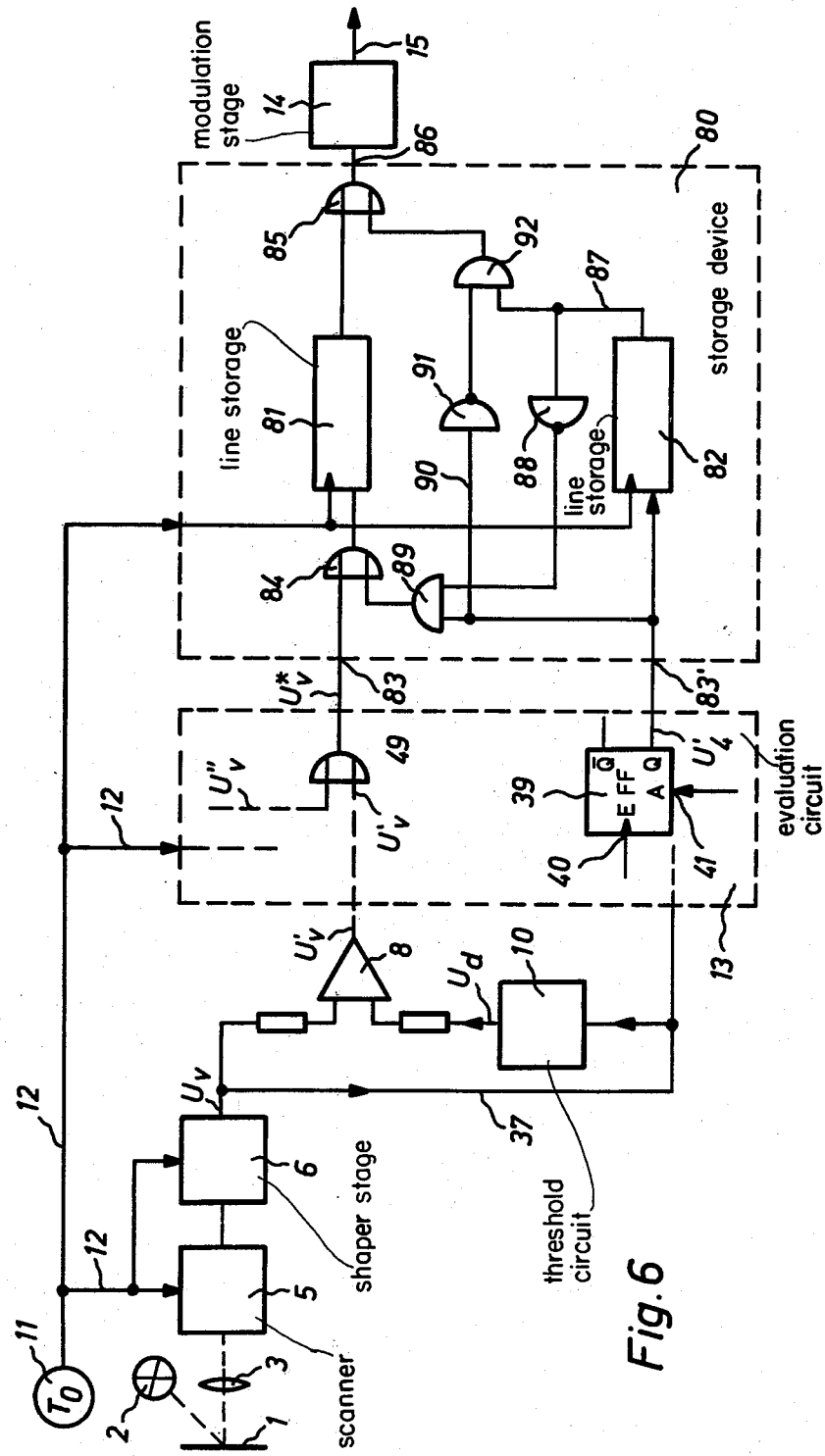
FIG. 6 shows a block diagram of a storage device for generating horizontal boundary lines.

In FIG. 6, therefore, an advantageous development of the concept of the invention is shown which consists of a storage device 80, following evaluation circuit 13, with which closed and horizontal boundary lines are generated.

For reasons of clarity, in FIG. 6 only those assemblies of evaluation circuit 13 from FIG. 1 have been retained which contribute to the understanding of storage device 80.

Essentially, storage device 80 consists of two line stores 81 and 82 in the form of shift registers clocked by scanning clock sequence $T_o$ on line 12.

During the scan of the original the digital video signal $U^*_v$ is entered line by line via an input 83 and an OR gate 84 into the first line store 81, output delayed by one line via another OR gate 85 and output 86 of storage device 80, fed to modulation stage 14 and recorded.

The second line store serves as intermediate storage in each case for the associated control signal $U'_4$ the course of which specifies if the digital video signal $U'_v$ has been modified in evaluation circuit 13 or not.

Assuming that a first line signals "white," any modification of video signal $U^*_v$ of the line following it in evaluation circuit 13 is cancelled while it is being entered into line store 81 by control signal $U'_4$ of the first line via line 87, inverter 88 and AND gate 89, generating an upper boundary line the width of which corresponds to one line.

If the video signal of a line finally signals "white" again at the bottom edge of an area, here, too, the modification of the signal in the previous line is cancelled via line 90, inverter 91 and AND gate 92 and a bottom boundary edge is recorded. The width of the horizontal boundary lines can comprise one or several lines, according to the number of stores used.

Figure 7:
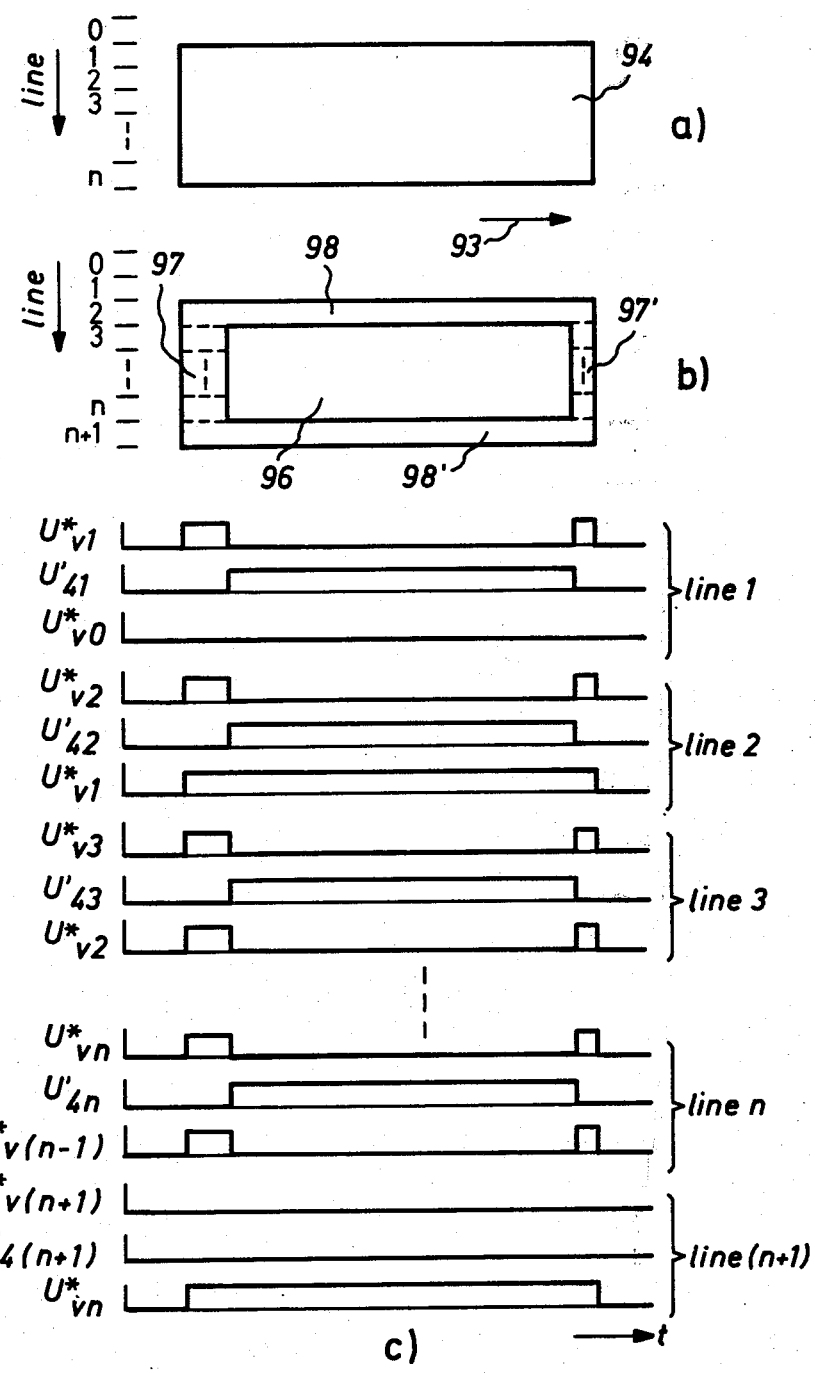
FIG. 7 shows a pulse diagram showing the operation of the storage device.
Figure 8:
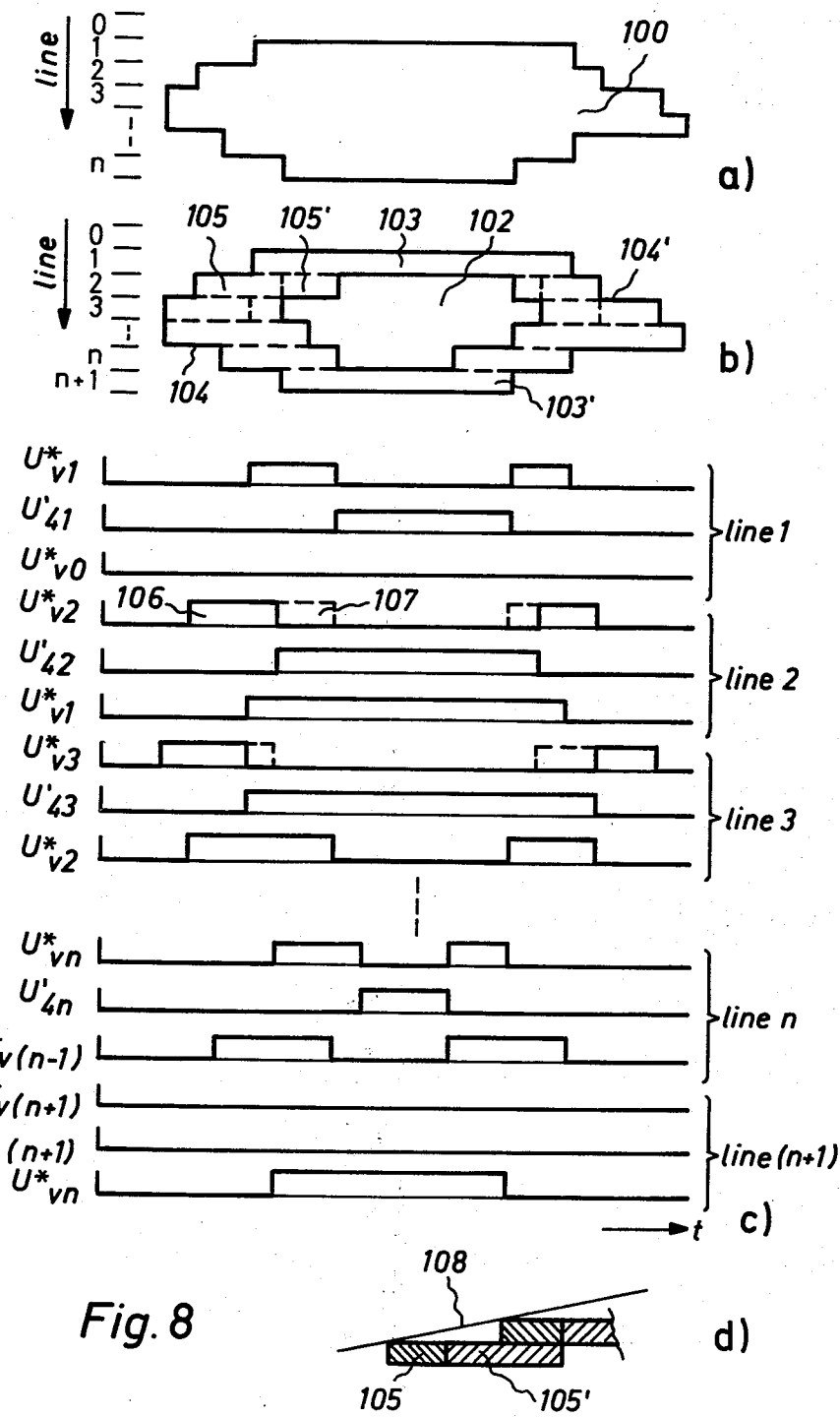
FIG. 8 shows another pulse diagram showing the operation of the storage device.

The operation of the storage device 80 is explained with the aid of FIGS. 7 and 8.

In FIG. 7, (a) shows a rectangular grey or coloured area 94 of the original, aligned at right angles to the line direction 93, where the area 94 can be a background area or even an item of information (broad letter), and (b) the reproduction of area 94 of the original as white area 96 with a black edging of vertical boundary lines 97;97' and horizontal boundary lines 98;98'.

In (c) in each case for one scanning line the curves of digital video signal $U^*_v$ and control signal $U'_4$ at inputs 83 and 83', and video signal $U^*_v$ at output 86 of the storage device 80 for the previous scanning line are shown which, as mentioned before, in each case is fed to modulation stage 14 and recorded delayed by one line.

During scanning of line 0 of area 94 of the original digital video signal $U'_{vo}$ at the input of evaluation circuit 13 is at L (white).

Since control signal $U'_{40}$ is also at L the digital video signal $U'_{vo}$ is not modified in evaluation circuit 13. Digital video signal $U^*_{vo}$ at the output of evaluation circuit 13 and control signal $U_{40}$ are entered into line stores 81 and 82, respectively, of storage device 80.

As the first line of area 94 of the original is scanned the digital video signal $U'_{v1}$ goes to H (black). Evaluation circuit 13, however, switches it to "L" and at the right edge of area 94 of the original back to "H", resulting in the curves $U^*_{v1}$ and $U'_{41}$ for the first line.

While $V^*_{v1}$ and $U'_{41}$ of the first line are being entered into line stores 81 and 82 the digital video signal $U^*_{vo}$ of line 0 is read out via OR gate 85 and recorded. At the same time control signal $U'_{40}$ of line 0, read out, cancels the switching and restoring process at digital video signal $U'_{vo}$ of the first line before storage in line store 81 via line 87, inverter 88, AND gate 89 and OR gate 84, so that on scanning of the second line a video signal $U^*_{v1}$ is read out of line store 81, as shown in (c) under the second line. This video signal $U^*_{v1}$ is in the H region over the whole area 94 of the original (black), resulting in upper boundary line 98 being generated.

The switching and restoring process is cancelled also for digital video signal $U^*_{vn}$ of line $\underline{n}$ at the bottom edge of area 94 of the original, giving rise to lower boundary line 98'. This occurs when the digital video signal $U^*_{vn}$ of line n is read out during scanning of line (n+1) by the associated control signal $U'_{4n}$ via line 87, AND gate 92 and OR gate 85.

FIG. 8 shows in (a) an area 100 of an original copy with stepped lateral edges and in (b) the copy of this area of the original as white area 102 with horizontal boundary lines 103;103' and correspondingly shaped vertical boundary lines 104;104', composed line by line from individual line elements 105.

The logical operation on the input and output signals of line stores 81 and 82 in storage device 80 (FIG. 6) advantageously achieves an overlap of the line elements 105 in the direction of the line. For this, for example during recording of the second line, the width of line element 105, actually preset by pulse width 106 of the associated digital video signal $U^*_{v2}$, is extended by portion 105' by a pulse 107 extended correspondingly.

The overlap effect, explained in greater detail in graphic representation (d), advantageously produces a uniform structure in the vertical boundary lines, particularly with edges 108 of the original running at a small angle to the horizontal.

FIG. 9 shows an illustrative embodiment for threshold circuit 10. It consists of a first generator 111 for generating a first accompanying signal $U_{b1}$ which is at a level above video signal $U_v$, a second generator 112 for generating a second accompanying signal $U_{b2}$ at a level below that of video signal $U_v$, a combining stage 113 and a third generator 114. In combining stage 113 the dynamic threshold signal $U_d$ on line 9 is derived from the two accompanying signals $U_{b1}$ and $U_{b2}$ by voltage division. The dynamic threshold signal $U_d$ runs between the accompanying signals $U_{b1}$ and $U_{b2}$ in each case and its distance to the accompanying signals can be set by means of potentiometer 115.

The third generator 114 consists of a peak rectifier circuit (116;117) with a smoothing capacitor 118 and a following high-impedance amplifier 119.

In each case the smoothing capacitor 118 is charged to the highest video signal amplitude (background white). Due to the high-impedance amplifier 119 the discharge time constant is very great and the smoothing capacitor 118 will discharge only very little between individual charging phases.

From the voltage across the capacitor difference values $U_5$ and $U_6$ are derived by means of potentiometers 120 and 121 on lines 122 and 122' and are proportional to the average background brightness of the original 1 scanned.

Difference values $U_5$ and $U_6$ are representative of certain minimum distances between the accompanying signals $U_{b1}$ and $U_{b2}$ and a reference signal which are maintained during the generation of the accompanying signals.

In this case the minimum distances will depend on the average background brightness of original 1. They can also be preset to be constant, however.

In the illustrative embodiment selected the reference signal is the video signal so that the minimum distances in each case exist between an accompanying signal and the video signal.

The first generator 111 for generating the first accompanying signal $U_{b1}$ operates in the following way:

The first generator 111 has a charging capacitor $C_1$, a charging circuit with resistor $R_1$ and transistor 123 and a discharging circuit with resistor $R_2$, diode 124 and summing amplifier 125.

The capacitor charge with a small time constant ($\tau_1 \approx R_1 \times C_1$) is controlled by video signal $U_v$ on line 7 via transistor 123 and a diode 126. The discharge of the capacitor, on the other hand, takes place with a large time constant ($\tau_2 \approx R_2 \times C_1$) and is affected by output voltage $U_{a1}$ of summing amplifier 125. Output voltage $U_{a1}$ corresponds to the sum of video signal $U_v$ and the associated difference value $U_5$. The summing of the signals means a displacement of video signal $U_v$ in the positive direction by the amount of difference value $U_5$.

The first accompanying signal $U_{b1}$ corresponds to voltage curve $U_c$ at charging capacitor $C_1$.

With a rising video signal $U_v$ the charging capacitor $C_1$ is charged with small time constant $\tau_1$ in each case to video signal $U_v$, causing accompanying signal $U_{b1}$ to follow the video signal $U_v$. With a drop in video signal $U_v$ transistor 123 is blocked and charging of the capacitor stops. The maximum charge $U_{c1}$ of the capacitor is retained approximately since the output amplifier 123 following it has a high input impedance and the discharge circuit is still disabled.

Only when the accompanying signal $U_{b1}$ has separated from the video signal $U_v$ by difference value $U_5$ is diode 124 opened and discharging with time constant $\tau_2$ is initiated.

In this phase accompanying signal $U_{b1}$ approaches video signal $U_v$ according to a function of e until difference value $U_5$ has been reached again and discharging is stopped.

It is preferable to select the discharge time constant $\tau_2$ to be approximately equal to the scanning time for two to five picture elements on the original 1. Of course, accompanying signal $U_{b1}$ can approach video signal $U_v$ also according to another function. As final value for the discharge the video signal itself or the black value can be used, apart from the minimum distance.

Charging capacitor again retains the voltage attained until accompanying signal $U_{b1}$ agrees with video signal $U_v$. The accompanying signal $U_{b1}$ will then follow the rise in the video signal again.

The second generator 112 for generating the second accompanying signal $U_{b2}$ also consists of a charging capacitor $C_2$, a charging circuit with a resistor $R_3$ and a transistor 129, a discharge circuit with a resistor $R_4$, a diode 130 and a difference amplifier 131 and a high-impedance output amplifier 132 following the charging capacitor $C_2$.

Difference amplifier 132 displaces video signal $U_v$ in the negative direction by the amount of difference value $U_6$.

In contrast to first generator 111 the supply voltages and the diodes are of opposite polarity and transistor 129 is in complementary configuration. Since the generators operate in similar ways further explanations are unnecessary.

We claim:

1. In a facsimile reproduction, a method for converting a video signal, generated by scanning an original copy dot by dot and line by line, into a bilevel black/white signal, wherein coloured, grey or black areas on an original are recorded as "white" edged with black boundary lines, and wherein said video signal is converted into said black/white signal by comparing it with a threshold signal following it dynamically, a signal step occurring in said black/white signal at every intersection point of said video signal and said threshold signal, and for generating a boundary line running transversely with respect to the direction of the lines at the beginning of the area, said black/white signal is switched to "white" after a first time interval beginning with the step in the signal from "white" to "black" if there has been no step in the signal from "black" to "white" in said first time interval.

2. A method according to claim 1, wherein said video signal is converted into said black/white signal by comparing it with a first threshold signal following it dynamically, a signal step occurring in said black/white signal at every intersection point of said video signal and said first threshold signal; for determination of an item of information contained in the area of said original said video signal is additionally compared with a second threshold signal which is essentially constant, in order to determine the intersection points; for generating a boundary line running transversely with respect to the direction of the lines at the beginning of the area said black/white signal is switched to "white" after a first time interval beginning with the step in the signal from "white" to "black" if there has been no step in the signal from "black" to "white" in said first time interval and no intersection with said second threshold signal; and wherein said black/white signal for recording the information contained in the area of the original is switched back to "black" if there is an intersection with said second threshold signal within the area of the original.

3. A method according to claim 1, wherein, for generating horizontal boundary lines for an area of the original the switch to "white" in said black/white signal at the end of said first time interval is cancelled again for at least the first and/or the last scanning line of the area of the original.

4. A method according to claim 1, wherein the black/white signal for generating a boundary line at the end of the area is switched to "black" in a second time interval beginning with the step in said signal from "black" to "white" at the end of the area, and determining the width of the boundary line, if no intersection point has been established with said second threshold signal within the area of the original and wherein said black/white signal is recorded delayed by said second time interval.

5. A method according to claim 1, wherein in the dot-by-dot and line-by-line scanning of the original, one cycle of a scanning clock sequence is allocated to each picture element, and wherein a number of clock cycles is allocated to a time interval (width of a boundary line).

6. A method according to claim 5, wherein the number of clock cycles for said first time interval is counted by means of a first counter, the output signal of said counter switches the black/white signal to "white," and said counter is reset if during counting, said video signal intersects said first or said second threshold signal.

7. A method according to claims 5 or 6, wherein between 10 and 30 clock cycles (picture elements) are allocated to said first time interval.

8. A method according to claim 4 or 5, wherein the number of clock cycles for said second time interval is counted by means of a second counter, and the output signal of said counter switches the black/white signal to "black" during counting.

9. A method according to claim 5, wherein between 1 and 5 clock cycles (picture elements) are allocated to said second time interval.

10. A method according to claim 4 or 5, wherein said black/white signal is delayed by said second time interval by means of a shift register controlled by the scanning clock sequence.

11. A method according to claim 3, wherein, from the comparison of said video signal with said first and second threshold signals a digital control signal controlling the switch-over of the black/white signal is generated; the digital black/white signal and its associated control signal are entered line by line each into a line store; for generating horizontal boundary lines for an area of the original the switch-over in said black/white signal to "white" at the end of said first time interval is cancelled by a logic operation on the black/white signal and the control signal, and wherein said black/white signal for one scanning line is read out in each case, and recorded, when the next scanning line is being read in.

12. A method according to claim 2, wherein the amplitude of said second threshold signal is proportional to the average value of background brightness of the original.

13. A method according to claim 12, wherein the amplitude of said second threshold signal is between 10% and 40% of the average brightness values of the background of the original.

14. A method according to claim 2, wherein the amplitude of said second threshold signal is preset to be constant.

15. A method according to claim 14, wherein the amplitude of said second threshold signal is between 10% and 40% of the greatest difference in video signal amplitude between "black" and "white".

16. A method according to claim 14, wherein a black area on the original is framed "white" with black boundary lines (black area suppression), and the amplitude of said second threshold signal is selected to be smaller than the amplitude of said video signal during scanning of the black area on the original.

17. A method according to claim 2, wherein from said video signal first and second accompanying signals are generated and from said accompanying signals said first threshold signal following said video signal dynamically is derived.

18. A method according to claim 17, wherein said first accompanying signal essentially follows the rising video signal, with dropping video signal maintains the voltage amplitude attained with maximum video signal until a difference value between said first accompanying signal and a reference signal has been reached, then approaches the dropping video signal until it reaches the difference value to said reference signal, maintains its voltage level now reached until it essentially agrees with said video signal, and then again follows the rising video signal; said second accompanying signal essentially follows the dropping video signal, with rising video signal maintains the voltage level attained with minimum video signal until a difference value between said second accompanying signal and another reference signal has been reached, then approaches the rising video signal until it reaches the difference value to said further reference signal, maintains its voltage level now reached until it essentially agrees with said video signal, and then again follows the dropping video signal, and wherein said first threshold signal is derived by voltage division between said accompanying signals.

19. A method according to claim 17 or 18, wherein said video signal constitutes said reference signal for said difference values.

20. A method according to claim 17 or 18, wherein in each case, one said accompanying signal constitutes said reference signal for said difference value of said other accompanying signal.

21. A method according to claim 17, wherein said difference values are proportional to the average brightness values of the background of the original.

22. A method according to claim 17, wherein said difference values are preset to be constant.

23. A method according to claim 17, wherein said accompanying signals are generated by charging and discharging capacitors under the control of said video signal and said difference values, the charging time constants being chosen to be small and the discharging time constants to be large in each case; said first capacitor is charged with a rising video signal at the one charging time constant to said video signal and discharged with dropping video signal at the one discharge time constant, and said second capacitor is charged with a dropping video signal at the other charging time constant to said video signal and is discharged with rising video signal at the other discharge time constant.

24. A method according to claim 23, wherein the discharge time constant is selected to be approximately equal to the scanning time for 2–5 picture elements in the original.

25. A method according to claim 8 wherein between 1 and 5 clock cycles (picture elements) are allocated to said second time interval.

* * * * *